United States Patent
Danielson et al.

(10) Patent No.: US 7,206,563 B1
(45) Date of Patent: Apr. 17, 2007

(54) REDUCTION OF RADIO FREQUENCY INTERFERENCE (RFI) PRODUCED BY SWITCHING AMPLIFIERS

(75) Inventors: Michael S. Danielson, Wrentham, MA (US); Michael W. Determan, Brighton, MA (US)

(73) Assignee: Apogee Technology, Inc., Norwood, MA (US)

( * ) Notice: Subject to any disclaimer, the term of this patent is extended or adjusted under 35 U.S.C. 154(b) by 417 days.

(21) Appl. No.: 10/826,732

(22) Filed: Apr. 16, 2004

Related U.S. Application Data

(60) Provisional application No. 60/463,548, filed on Apr. 17, 2003.

(51) Int. Cl.
    *H04B 1/10* (2006.01)
(52) U.S. Cl. .................. 455/307; 455/334; 455/339; 375/350
(58) Field of Classification Search ............... 455/296, 455/307, 306; 375/245, 243, 247, 232
    See application file for complete search history.

(56) References Cited

U.S. PATENT DOCUMENTS

| | | | | |
|---|---|---|---|---|
| 4,819,197 A | * | 4/1989 | Blais | 455/307 |
| 4,866,260 A | * | 9/1989 | Lescourret | 455/296 |
| 6,188,804 B1 | * | 2/2001 | Weldy et al. | 455/334 |
| 6,243,430 B1 | * | 6/2001 | Mathe | 375/350 |
| 6,600,788 B1 | * | 7/2003 | Dick et al. | 375/245 |
| 2001/0031022 A1 | * | 10/2001 | Petrus et al. | 375/245 |
| 2001/0033341 A1 | * | 10/2001 | Limberg | 375/350 |
| 2003/0026370 A1 | * | 2/2003 | Dati et al. | 375/361 |
| 2003/0072284 A1 | * | 4/2003 | Webster et al. | 455/307 |
| 2004/0037371 A1 | * | 2/2004 | Brennan | 375/243 |
| 2006/0088098 A1 | * | 4/2006 | Vehvilainen | 375/243 |

FOREIGN PATENT DOCUMENTS

JP    02131611 A2  *  5/1990

* cited by examiner

*Primary Examiner*—Lana Le
(74) *Attorney, Agent, or Firm*—Toler Schaffer, L.L.P.

(57) ABSTRACT

Apparatus and methods for reducing radio frequency interference produced by switching amplifiers, includes a variable-order noise shaper in a system that includes an AM tuner. An alternative implementation involves determining the tuned frequency of a radio signal. A first sampling rate is provided at which the radio signal is to be sampled. The first sampling rate is associated with a plurality of first harmonic frequencies. A second sampling rate is also provided and is associated with a plurality of second harmonic frequencies different than the first harmonic frequencies. The method involves selectively sampling the radio signal at one of the first and second sampling rates, wherein the first sampling rate is selected when the first harmonic frequencies do not coincide with the tuned frequency, and the second sampling rate is selected when the second harmonic frequencies do not coincide with the tuned frequency. A still further alternative implementation for reducing RFI involves the second sampling rate being derived using linear interpolation.

5 Claims, 7 Drawing Sheets

Modified Noise Shaper Flow Diagram showing selection of High and Low order FIR filters.

Figure 1 : Spectrum of simulation of typical digital amplifier output.

PRIOR ART

Figure 2 : Flow diagram of typical Noise-Shaper used in digital amplifier.

PRIOR ART

Figure 3: Modified Noise Shaper Flow Diagram showing selection of High and Low order FIR filters.

Figure 4 : Spectrum of simulation of digital amplifier output with modified Noise Shaper.

Figure 5 Sample rate Fs vs. Tuned Frequency

REDUCTION OF RADIO FREQUENCY INTERFERENCE (RFI) PRODUCED BY SWITCHING AMPLIFIERS

CROSS REFERENCE TO RELATED APPLICATIONS

This patent application claims priority from U.S. Provisional Patent Application No. 60/463,548, filed on Apr. 17, 2003, the contents of which are incorporated herein by reference in its entirety.

FIELD OF THE INVENTION

The present invention relates generally to power switching amplifiers, and more particularly to reducing radio frequency interference produced thereby.

BACKGROUND OF THE INVENTION

Switching amplifiers are commonly referred to as digital amplifiers, and may be implemented by either digital or analog means. Such switching amplifiers utilize well known methods of switching power at high frequencies in order to achieve efficiency advantages over analog amplifiers. However, the frequency that digital amplifiers switch at, and the signal processing methods associated therewith, can cause radio frequency interference (hereinafter referred to as "RFI", or simply "interference"), particularly in consumer electronic equipment incorporating such amplifiers.

In regard to methods for reducing RFI, it is noted that the best possible audio performance measurements for AM radio are significantly lower than the best possible audio performance measurements for digital amplifiers. This fact enables the use of methods that, when reducing RFI, also lower the audio performance measurements without lowering the total system performance, since the AM tuner will be the limiting factor in the overall (i.e., AM tuner+digital amplifier) system performance.

Certain sources of interference will now be discussed with reference to FIGS. 1 and 2. FIG. 1 illustrates the output signal spectrum of a prior art digital amplifier that includes the noise shaper 10 shown in FIG. 2. See, for example, U.S. Pat. No. 5,617,058 to Adrian et al., which is incorporated herein by reference. The output illustrated in FIG. 1 represents the "normal operational mode," that is, the operational mode in which the interference is not reduced. Note that the level of the signal at any given frequency reflects the amount of radio frequency energy present at the amplifier output.

FIG. 1 illustrates the two main sources of interference present in the AM band between 530 kHz to 1.700 MHz. The first source of RFI is recognized as a distinct component or spike 100 at multiples of the output switching or modulation frequency. Note that Pulse Width Modulation ("PWM") inherently generates these components 100 at the modulation frequency and at harmonic multiples thereof. Typically, the first three harmonics are in the AM band, since the normal values for the switching frequency are typically 352.8 KHz and 384 KHz, for devices that play back audio CDs, and video surround sound DVDs, respectively. This switching frequency is typically a multiple of the original sample rate, "fs."

The second source of RFI is noticed as a rise in the noise floor 102 between the modulation harmonics. This interference 102 is generated by the prior art noise-shaper 10 shown in FIG. 2. Noise shaping is used in digital amplifiers to reduce the amount of noise in the audio band (20 Hz to 20 kHz) by increasing the amount of noise outside of the audio band (20 kHz to fs). This creates a high amount of noise power radiated from the switching power stage in the region of 20 kHz to fs. This noise is replicated around all harmonics of the modulation frequency. This noise is also present at frequencies much higher than sample rates (frequencies) that can be seen in FIG. 1. The amount of noise generated between 20 kHz and fs is directly proportional to the amount of noise generated at all higher frequencies. Therefore if the amount of noise between 20 kHz and fs is lowered, the amount of noise at higher frequencies will also be lowered.

Note that the noise shaper 10 does not change the total amount of noise power present, but only redistributes this power across the greater spectrum. To achieve a high level of audio performance, the noise shaper 10 must lower significantly the amount of noise power in the audio band, at the expense of raising the amount of power outside of the audio band.

The relative level of noise power present in the audio band versus outside the audio band is determined by several factors. The largest factor is the order of the noise shaper 10. As shown in FIG. 2, a prior art noise shaper 10 uses a digital Finite Impulse Response (FIR) filter 12 in a feedback loop configuration. Note that the number of previous samples or taps used in this FIR filter 12 determines the order of the noise shaper 10. A larger amount of taps creates a higher order noise shaper, and will push more noise energy outside the audio band and create a higher amount of noise power in the 20 kHz to fs range.

SUMMARY OF THE INVENTION

The present invention provides solutions for reducing radio frequency interference produced in switching amplifiers.

According to the invention, an apparatus and method are provided for reducing radio frequency interference in a system that includes a radio receiver. The apparatus may be a variable-order noise shaper, and the radio receiver may be an AM tuner. The noise shaper comprises a requantizer for outputting a requantized signal based on an input signal. Also included is a first filter of a first order for receiving the requantized signal and outputting a first filtered signal. The noise shaper further includes a second filter of a second order higher than the first order. The second filter is for receiving the requantized signal and outputting a second filtered signal. A selection means is provided for selecting one of the first and second filters. When the AM tuner is not in use, the second filter is selected, and when the AM tuner is in use, the first filter is selected. An adder is also included for adding the output of the selected filter to the input signal.

In an alternative embodiment, the tuned frequency of a radio signal is determined and a first sampling rate is provided at which the radio signal is to be sampled. The first sampling rate is associated with a plurality of first harmonic frequencies. A second sampling rate is also provided and is associated with a plurality of second harmonic frequencies different than the first harmonic frequencies. The method involves selectively sampling the radio signal at one of the first and second sampling rates, wherein the first sampling rate is selected when the first harmonic frequencies do not coincide with the tuned frequency, and the second sampling rate is selected when the second harmonic frequencies do not coincide with the tuned frequency. This also applies to analog modulated Class D amplifiers where the sample rate is determined by the frequency of a ramp or triangle wave generator as is known in the art. The same result is affected by changing the frequency of the ramp or triangle wave generator.

A third embodiment for reducing RFI involves oversampling an inputted signal having a first sampling frequency and outputting an oversampled signal. Means are provided for selectively performing one of outputting the oversampled signal without changing the first sampling frequency when the audio source is not an AM tuner; or alternatively, resampling the oversampled signal by linear interpolation and outputting a signal having a second sampling frequency different than the first sampling frequency when the audio source is an AM tuner.

A feature of the embodiments of the invention is that the noise shaper has a variable order, whereas a prior art noise shaper has only a fixed order. This eliminates the need for multiple noise shapers. Thus, low cost implementation in a minimal number of integrated circuits is possible. Consequently, space requirements for implementation of switching amplifiers is substantially reduced over prior art configurations.

BRIEF DESCRIPTION OF THE DRAWINGS

These and other features of the present invention will be better understood when reading the following detailed description taken together with the accompanying drawing wherein.

DETAILED DESCRIPTION OF THE INVENTION

Figure 2:
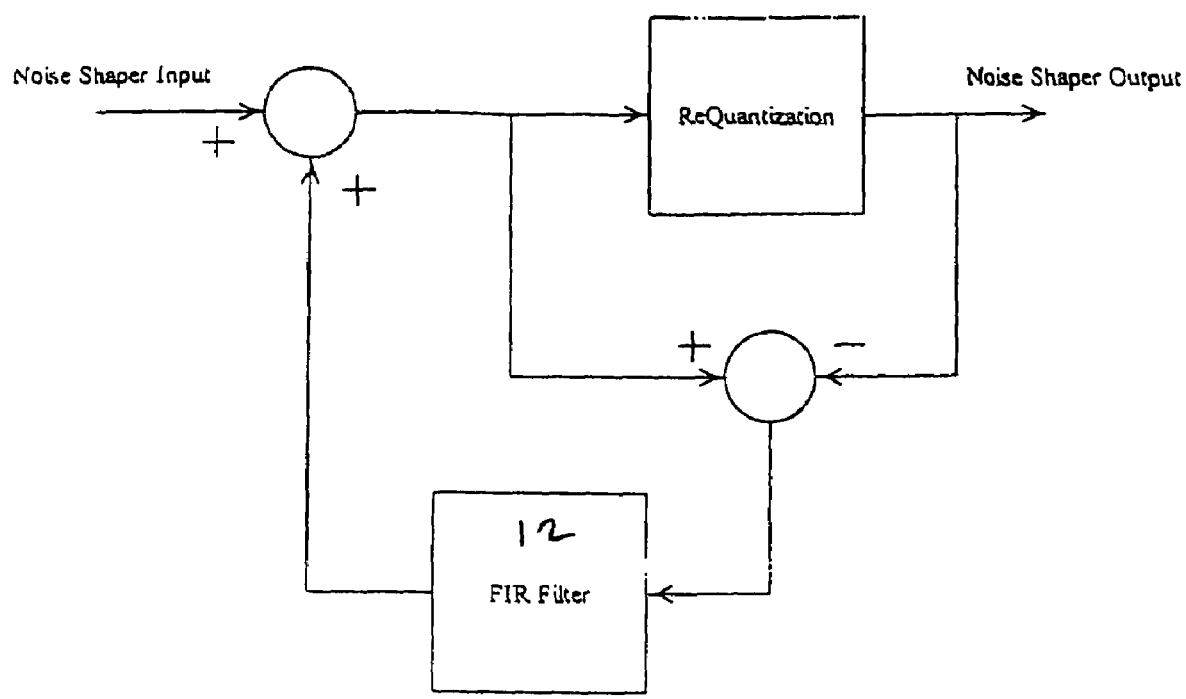
FIG. 2 illustrates a noise shaper known in the prior art.
Figure 3:
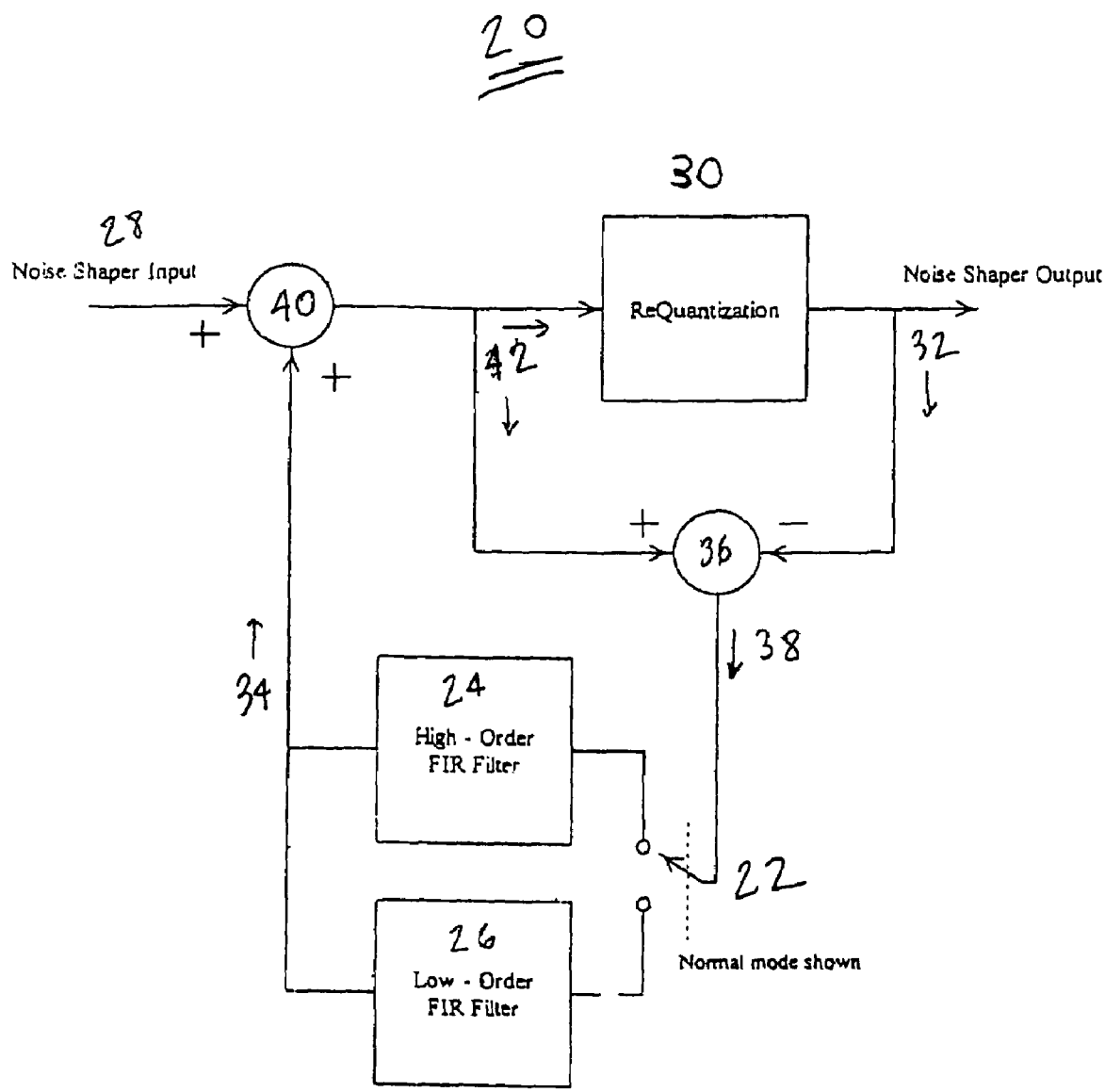
FIG. 3 illustrates a noise shaper for reducing radio frequency interference, according to a first embodiment of the invention.

FIG. 3 illustrates a block diagram of a noise shaper 20 according to the present invention. The inventive noise shaper 20 may be incorporated in, for example, a digital amplifier (not shown). Whereas the order of the prior art noise shaper 10 in FIG. 2 is "fixed", the order of the inventive noise shaper 20 is instead variable. Consequently, the amount of RFI generated by the noise shaper 20 can be greatly reduced, as compared with prior art noise shaper 10.

As seen in FIG. 3, the noise shaper 20 includes a first FIR filter 24, and a second FIR filter 26 in a feedback loop configuration. More specifically, the output 42 from a first adder 40 is supplied in parallel to a requantization unit 30 and to a second adder 36. Noise shaper output 32 is subtracted from first adder output 42, and the second adder output 38 from the second adder 36 is selectively supplied to one of the first and second FIR filters 24, 26 via a selecting means or switch 22. Filtered output 34 from one of the first and second FIR filters 24, 26, is added to noise shaper input 28 via the first adder 40.

According to the invention, the order of the noise shaper 20 is varied by providing the selecting means 22 for selecting among a plurality of FIR filters 24, 26. That is, the order of the noise shaper 20 corresponds to the order of the FIR filter selected. Generally, in the example shown in FIG. 3, either a high order FIR filter 24 or a low order filter 26 may be selected. For example, when a high order noise shaper is desired, the high order filter 24 is selected by the selecting means 22. On the other hand, the selecting means 22 is used to select the low order filter 26 when a low order noise shaper is desired.

One useful application of the above described noise shaper 20 is for reducing RFI in a system that includes an AM tuner (not shown). In this case, the order of the noise shaper 20 is varied depending on whether the AM tuner is in use or not. For example, when the AM tuner is not in use, a high order noise shaper is desired to achieve the best possible audio performance. In this instance, the selecting means 22 is used to select the high order FIR filter 24. On the other hand, when the AM tuner is in use, a low order noise shaper is desired to achieve the lowest possible amount of RFI. In this case, the selecting means 22 is used to select the low order FIR filter 26. Note that while the low order noise shaper yields lower audio performance than a higher order noise shaper, it nevertheless produces better audio performance than the AM tuner used alone, and is therefore not the limiting factor in system performance.

Figure 1:
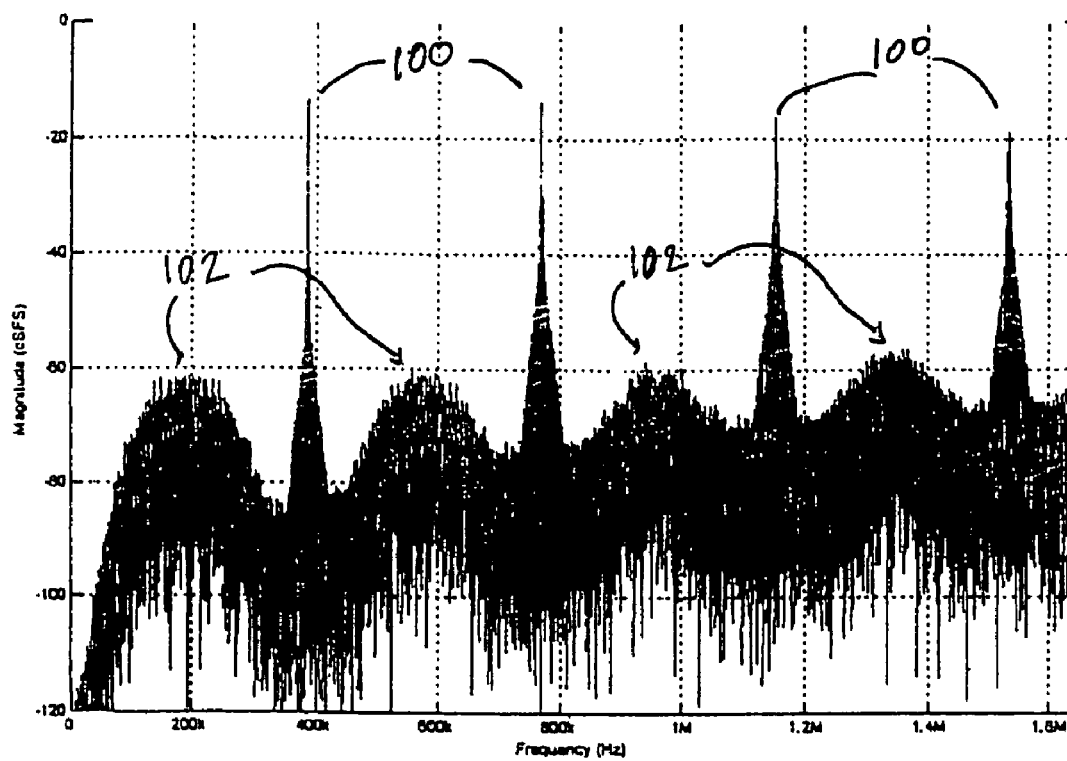
FIG. 1 illustrates the output spectrum of a digital amplifier, as understood in the prior art.
Figure 4:
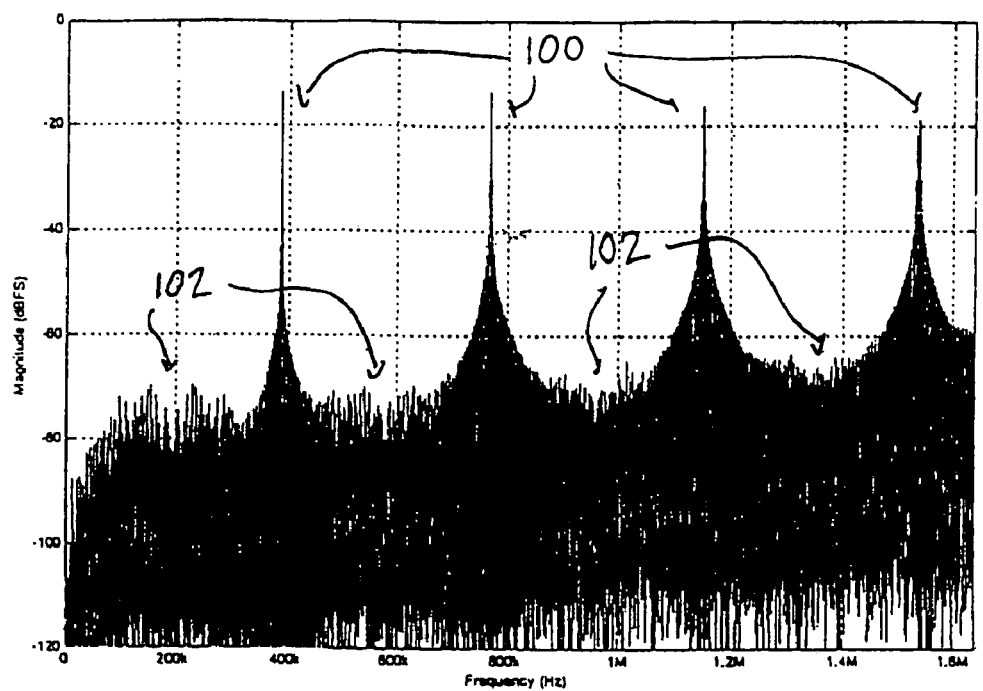
FIG. 4 illustrates the output spectrum of a digital amplifier incorporating the noise shaper of FIG. 3.

FIG. 4 illustrates the output spectrum of a digital amplifier incorporating the above described noise shaper 20 (with low order filter 26 selected) according to the present invention. Recall that FIG. 1, on the other hand, shows the output spectrum of a digital amplifier incorporating the prior art noise shaper 10 of fixed higher order. A comparison of FIGS. 1 and 4 shows an approximate 10 dB to 15 dB reduction in the noise floor 102 that represents interference in the AM band. Advantageously, products that incorporate digital amplifiers with the inventive noise shaper 20 will experience correspondingly reduced interference in the AM band, compared to products that include amplifiers with conventional fixed order noise shaper 10.

A second embodiment of the present invention will now be described with reference to FIG. 5, and is particularly useful in reducing the interference components 100 generated by the modulation frequency harmonics observed in FIGS. 1 and 4. Incidentally, these interference components 100 are not substantially reduced by the noise shaper 20 described hereinbefore.

These interference components 100 in FIG. 4 are narrow in the frequency bands they affect, but nevertheless cause RFI at these specific frequencies. In this connection, it is noted that radio receivers are essentially narrow band tuned filters that reject station signals which differ from the tuned station frequency. According to the invention, it follows that the interference components 100 can be removed by offsetting the digital amplifier modulation frequency away from the tuned station frequency.

Such offsetting requires knowing what frequency a radio is tuned to. This is easy to determine in modern radios which are typically tuned via a digital command from a microcontroller ("MCU"). Following tuning, the tuner reports its tuned frequency to the MCU in a digital format for display to a user. Accordingly, since it is possible to know the tuned frequency of a radio, it is therefore possible to detect when the modulation harmonics will interfere with the radio tuner.

Consequently, it is possible to change the modulation frequency to a frequency where interference will not occur.

According to the invention, at least two possible modulation frequencies need to be provided, and the system switches between these two modulation frequencies depending on which one will cause less RFI at the tuned frequency of the radio tuner. In this connection, it is noted that an analog to digital converter is used to convert the analog signal (from the radio tuner) to a digital signal which is supplied to the digital amplifier. The converter requires a digital clock source to set and control the sampling frequency (fs). Since the modulation frequency of the digital amplifier is related to this sampling frequency, the modulation frequency can be adjusted by varying the clock source.

Figure 5:
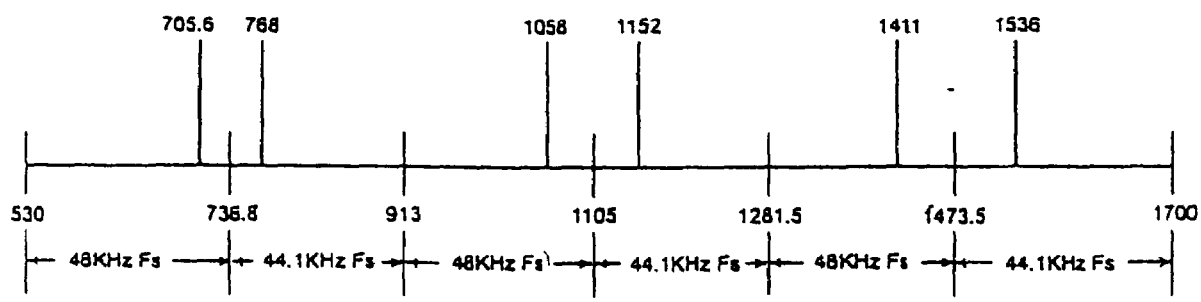
FIG. 5 illustrates sample rates relative to the AM broadcast band, according to a second embodiment of the invention.

FIG. 5 depicts one possible clock selection strategy. As explained above, the solution relies on a reporting signal from the AM tuner to determine a selection between two clock sources. In the present example, two different sampling frequencies (44.1 KHz, 48 KHz), their corresponding modulation frequencies, and the harmonics of the modulation frequencies are shown in FIG. 5. One clock is such that the sampling frequency is 44.1 KHz, producing a modulation frequency of 352.8 KHz with harmonics of 705.6 KHz, 1058 KHz and 1411 KHz. The other clock is such that the sampling frequency is 48 KHz, producing a modulation frequency of 384 KHz with harmonics at 768 KHz, 1152 KHz and 1536 KHz. Note that the choice of the second sampling frequency can be arbitrary, so long as the two sampling frequencies are not harmonically related.

According to the invention, varying the sampling frequency exploits the inherent "rejection" properties of the tuner and prevents harmonics of the PWM output from interfering with the tuned frequency. In FIG. 5, the second, third and fourth harmonics of the PWM corresponding to the 44.1 and 48 KHz sample rates are shown relative to the AM broadcast band. For different AM frequency intervals, one sample rate is chosen over another. In this example, for the tuner frequency bandwidth between 530 KHz and 737 KHz, the 48 KHz sample rate is used since the harmonics associated therewith (768 KHz, 1152 KHz and 1536 KHz) occur outside of that interval. For the bandwidth between 737 KHz and 913 KHz, the 44.1 KHz sample rate is used since the harmonics associated therewith (705.6 KHz, 1058 KHz and 1411 KHz) occur outside of that interval, and so on. This interval or frequency selection is arbitrary as long as the modulation frequency harmonics are sufficiently far from the desired tuned frequency for the tuner to reject the closest harmonic and achieve good audio performance.

Figure 6:
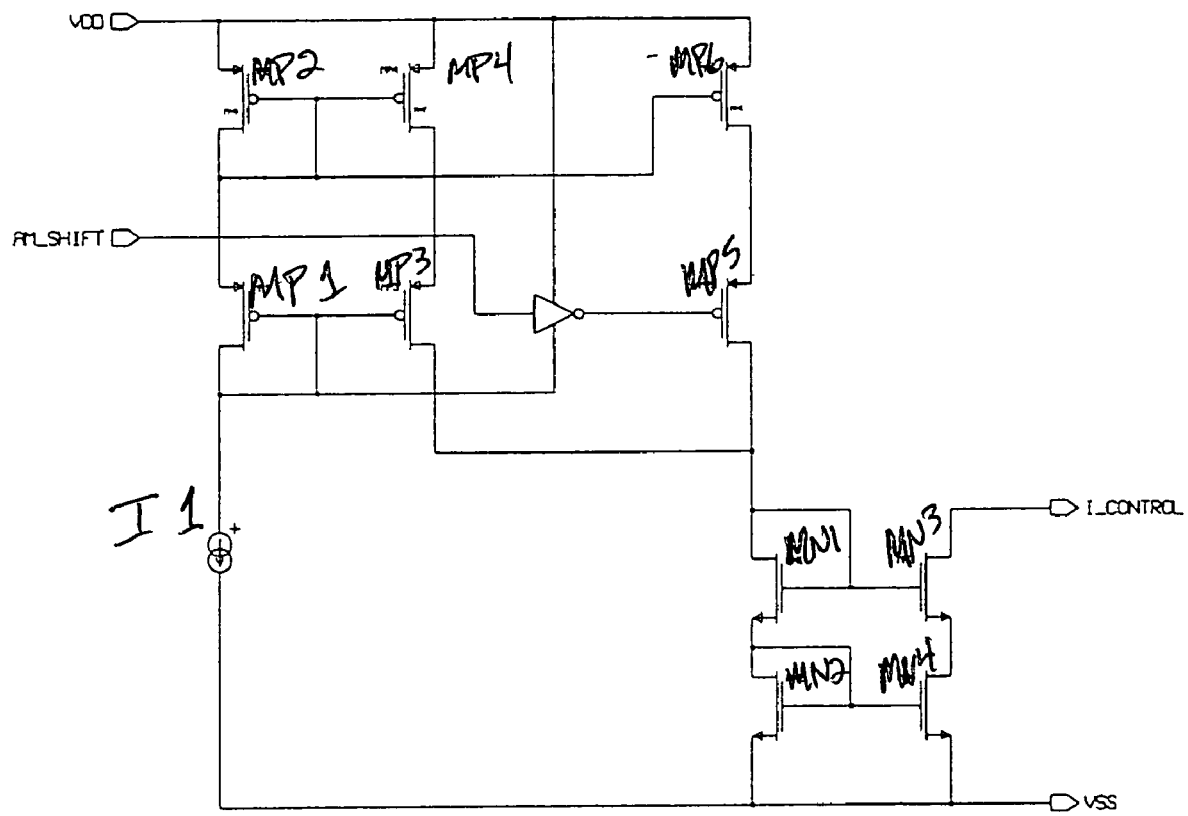
FIG. 6 illustrates a means of changing the, (sample rate), frequency of an analog modulated Class D amplifier according to the second embodiment with an arbitrary ratio suitable for use in an integrated circuit.

One method that is convenient for inclusion in an integrated circuit where class D PWM modulation is preformed in the analog domain is described below and illustrated in FIG. 6. Other methods of performing the same function or modifications will be appreciated by those of ordinary skill.

A relaxation oscillator can be used to set the frequency of an analog modulator; it has its oscillation frequency controlled by a known current source. Control is linear and is realized by a known current charging and discharging a known capacitor at a known rate. FIG. 6 shows a method of switching a control current I_CONTROL from one known current to another for use in situations where the oscillator frequency may interfere with operation of an AM radio.

When the AM_SHIFT input is at logic 0, current I1 is mirrored by MP1 to MP4 and multiplied by the ratio of gates MP4, (m=7): MP2, (m=8). In FIG. 6 the ratio shown is 7/8. This current is then mirrored by MN1 to MN4 and forms the control current for the oscillator. The oscillator is now running at a frequency proportional to 7/8 of the input current I1.

When AM_SHIFT is set to logic 1, further current is added to the input NMOS current mirror with a ratio of MP6, (m=1): MP2, (m=7) in this case 1/7. This additional current is added to the first current making the output current the same as the input. The oscillator will increase in frequency and will now run 1:1 proportionally to the input current I1. As before the actual values of the ratios are arbitrary as long as the modulation frequency harmonics are sufficiently far from the desired tuned frequency for the tuner to reject the closest harmonic and achieve good audio performance.

Figure 7:
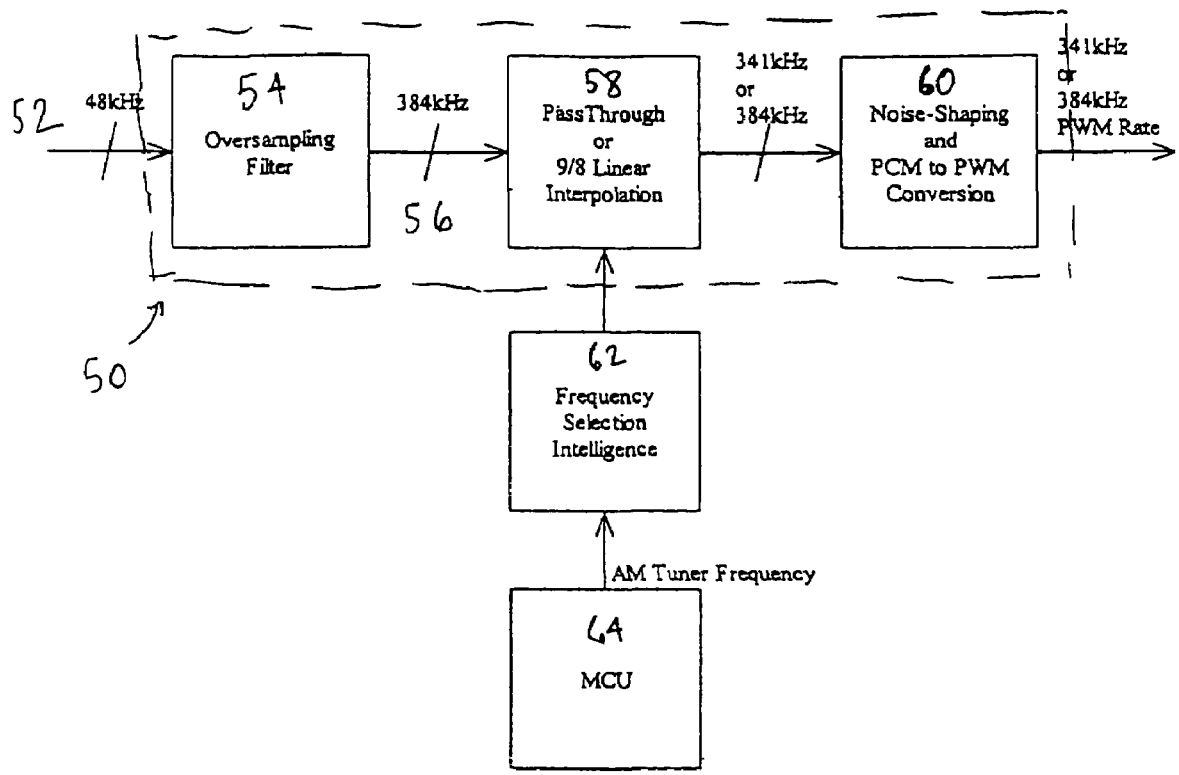
FIG. 7 illustrates a flow chart of a method for reducing radio frequency interference, according to the embodiment illustrated in FIG. 5.

FIG. 7 illustrates an implementation of the above described, "modulation frequency shifting" method for reducing RFI. In this implementation, only a single sampling frequency 52 is input to the digital amplifier 50. This may be desirable since varying the input sampling frequency would require additional circuitry. In the present example, the fixed input sampling frequency is 48 kHz, but other sampling frequencies could be input.

Input sampling frequency 52 is supplied to an oversampling filter 54 and oversampled by a factor of 8 according to a known technique for digital amplification. The output signal 56 (having frequency 384 kHz) is thereafter input to a signal processing circuit 58 that will either 1) pass the signal 56 without changing the sample rate; or 2) resample the signal 56 to a new sampling frequency via processing, such as by linear interpolation.

In this connection, linear interpolation is not commonly used in audio resampling, as it can cause small amounts of distortion and noise which may degrade the audio quality. However, such distortion and noise is still much less than the distortion and noise inherent to an AM radio tuner. Thus, in this illustrative embodiment, since the linear interpolation for resampling will only be used in conjunction with an AM tuner, the distortion and noise from the linear interpolation will be masked by the higher distortion and noise of the AM tuner. During operation where the audio source is other than an AM tuner, the linear interpolation will not be used. Note that linear interpolation for resampling is desirable because it can be performed cost-effectively, for example, in a digital IC with limited resources.

Referring further to FIG. 7, the implementation of linear interpolation via signal processing circuit 58 produces eight samples of output for every nine samples of input. This interpolation ratio produces a switching frequency of 341 kHz for a 48 kHz sample rate input. On the other hand, "normal" operation of circuit 58 (i.e., without interpolation) produces a switching frequency of 384 kHz with a 48 kHz sample rate input. Note that neither of these switching rates shares any harmonics in the AM tuner range, which is important for proper operation of the presently described method of RFI reduction. Incidentally, the output of circuit 58 is input to circuit 60 for subsequent processing such as noise shaping and PCM to PWM conversion.

The above mentioned interpolation rate of eight output samples for every nine input samples is also important because it permits the linear interpolation algorithm to be performed without multipliers, and thus conserves space in digital IC's. Instead, the algorithm utilizes a simple repetitive add. Each input sample is first divided by a factor of eight, which is accomplished by simply shifting the binary value of the input sample to the right by 3-bits. Each output sample is derived by eight accumulations of two adjacent input samples. The number of samples being accumulated from each of the two adjacent inputs is determined by a simple counter that counts to eight and then resets to zero. This counter is incremented once per output sample. The output samples are calculated as follows:

Output(1)=7*Input(1)/8+1*Input(2)/8

Output(2)=6*Input(2)/8+2*Input(3)/8

Output(3)=5*Input(3)/8+3*Input(4)/8

Output(4)=4*Input(4)/8+4*Input(5)/8

Output(5)=3*Input(5)/8+5*Input(6)/8

Output(6)=2*Input(6)/8+6*Input(7)/8

Output(7)=1*Input(7)/8+7*Input(8)/8

Output(8)=0*Input(8)/8+8*Input(9)/8=Input(9)

Output(9)=7*Input(10)/8+1*Input(11)/8

. . .

Also shown in FIG. 7 is Frequency Switching Intelligence circuit 62. As described previously, circuit 62 receives the tuned AM frequency from the MCU 64 and selects the output PWM frequency for the best performance with that tuner frequency. Note that all of the described circuitry, except for the MCU 64, can be contained within a single digital amplifier controller IC.

While the first disclosed embodiment herein included a two position switching means selecting between a high order and low order FIR, it should be appreciated that more than two FIRs can be implemented for providing selection therebetween.

Although the above described embodiments only showed a one means of determining the tuner frequency, and of changing the modulation frequency (and interfering harmonic frequency), it should be appreciated that other means of determining the tuner frequency, and other means of effecting a change in the modulation and interfering harmonic frequencies, are possible for both digital and analog systems.

Although the invention is shown and described in an illustrative embodiment of a standard AM broadcast band, it should be appreciated that the invention will also apply to radio bands other than the AM band, such as FM band, short wave band, or the like.

While the invention is described in the context of switching amplifiers and more particularly as audio amplifiers, it should be appreciated that the invention can be implemented in numerous other applications, such as switch mode power supplies to accomplish similar reductions in radio receiver interference.

Although the invention is described hereinbefore with respect to illustrative embodiments thereof, it will be appreciated that the foregoing and various other changes, omissions and additions in the form and detail thereof may be made without departing from the spirit and scope of the invention.

What is claimed is:

1. An apparatus for reducing radio frequency interference in a system that includes a radio receiver, the apparatus comprising:

a requantizer for outputting a requantized signal based on an input signal;

a first finite impulse response (FIR) filter of a first order, said first FIR filter for receiving said requantized signal and outputting a first filtered signal;

a second FIR filter of a second order higher than the first order, said second FIR filter for receiving said requantized signal and outputting a second filtered signal;

a selection means for selecting one of the first and second FIR filters, wherein when said radio receiver is not in use, said second FIR filter is selected, and when said radio receiver is in use, said first FIR filter is selected; and a first adder for adding the output of the selected FIR filter to said input signal.

2. The apparatus of claim 1, wherein said apparatus is a variable-order noise shaper, wherein said noise shaper is of an order corresponding to an order of the selected FIR filter.

3. The apparatus of clam 1, wherein said radio receiver is an amplitude modulation (AM) tuner.

4. The apparatus of claim 1, further comprising a second adder, wherein the second adder produces a second adder output by subtracting a noise shaper output from an output of the first adder and sends the second adder output to the selected filter.

5. The apparatus of claim 1, wherein the input signal is a digital signal received at a digital amplifier from an analog to digital converter.

* * * * *